Sheet 1
2-Sheets
F. Nishwitz.
Mower.
№ 3497 Reissued Jun. 8, 1869.
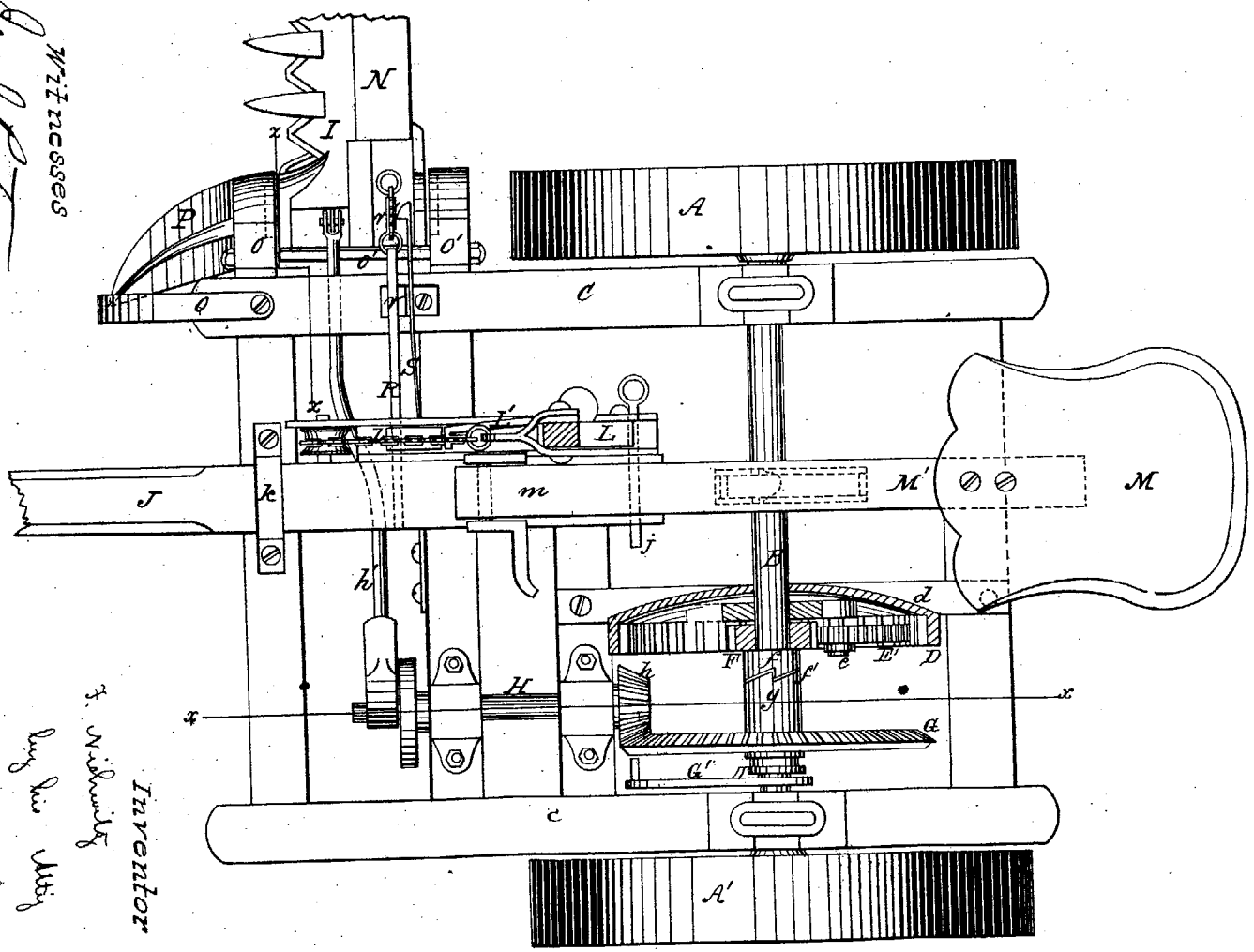
Witnesses
Joe S. Peyton
Baltis D. Long
Inventor
F. Nishwitz
by his Atty
Wm. W. Baldwin 2 Sheets
Sheet 2
F. Nishwitz.
Mower.
No. 3497 Reissued Jun. 8, 1869.
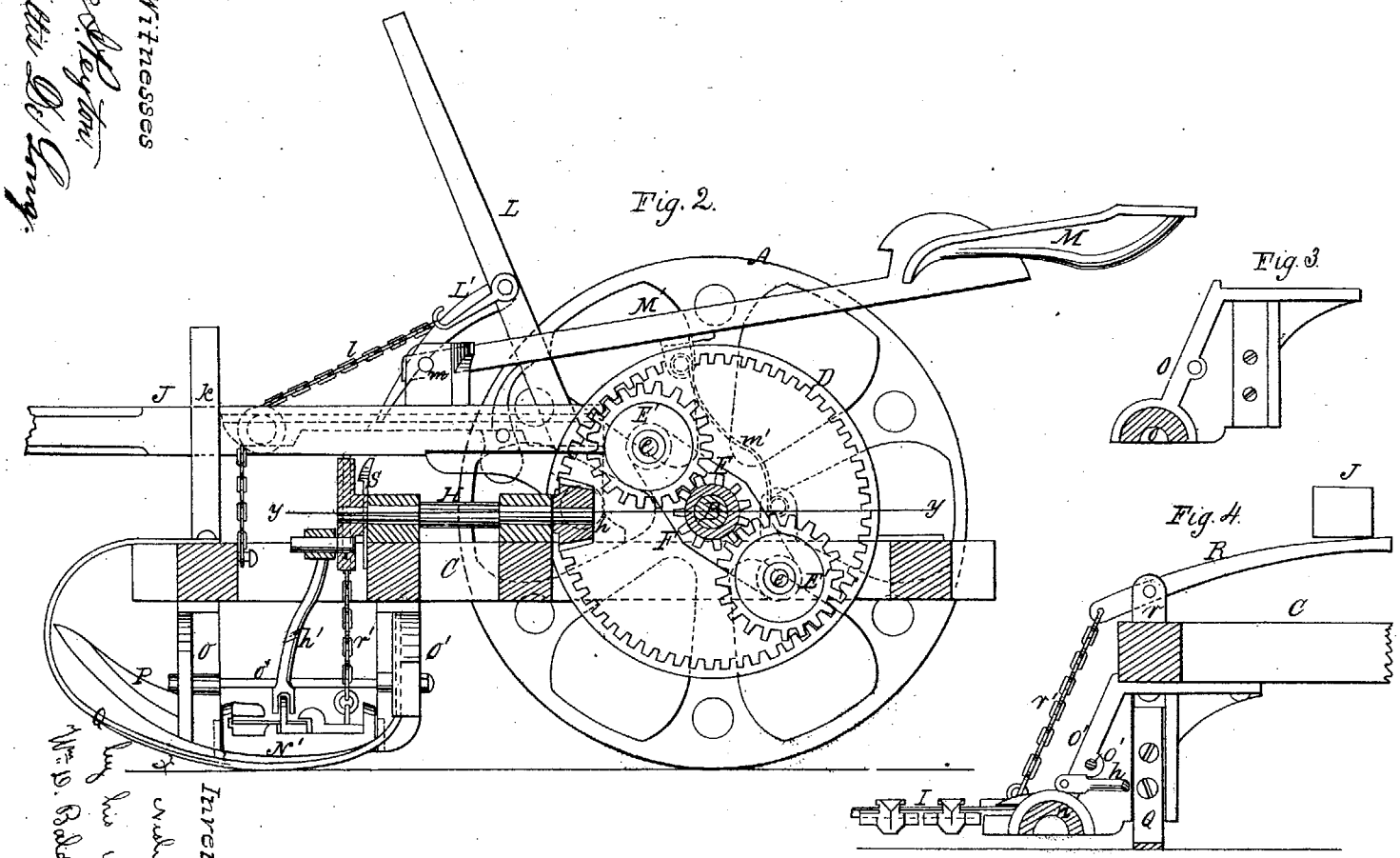
Witnesses
Joe A. Peyton.
Battis De Long.
Inventor
F. Nishwitz
by his Atty
Wm. D. Baldwin

UNITED STATES PATENT OFFICE.

F. NISHWITZ, OF BROOKLYN, NEW YORK.

IMPROVEMENT IN HARVESTERS.

Specification forming part of Letters Patent No. 46,488, dated February 21, 1865; Reissue No. 3,497, dated June 8, 1869.

DIVISION C.

*To all whom it may concern:*

Be it known that I, FREDERICK NISHWITZ, of Brooklyn, in the county of Kings and State of New York, have invented certain new and useful Improvements in Harvesters, of which the following is a full, clear, and exact description.

My invention relates to that class of harvesters having two driving and supporting wheels and a finger-beam hinged to the main frame at one end only; and the improvement herein claimed consists in a novel method of constructing the driving-gearing and combining it with the harvester, as hereinafter fully set forth.

The accompanying drawings represent all my improvements as embodied in a machine similar, in its general outlines, to the one shown and described in Letters Patent of the United States No. 19,377, granted to me on the 16th day of February, 1858.

Figure 1 represents a plan or top view of my improved machine; and Fig. 2 represents a vertical longitudinal section through the machine at the line *x x* of Fig. 1, looking toward the divider side of the machine.

In this instance the two driving-wheels A A′ are shown as mounted loosely on a common axle, B, with which they are connected by backing-ratchets of well-known construction. The axle B revolves loosely in suitable bearings on the gearing-frame C. An internally-geared spur-wheel, D, is secured upon a concave disk, *d*, fixed upon the gearing-frame in such manner that the spur-wheel D is concentric with the axle B. The disk D incloses the gears E and F on one side, and thus protects the driver from getting caught in them. An arm, E, fixed upon, revolving with, and projecting on each side of, the axle B, carries spur-pinions E′, revolving freely on pins *e*, and meshing on one side into the spur-wheel D, and on the other into a spur-pinion, F, fixed on a collar, *f*, turning freely on the main axle, and connected by a feather, *f′*, with a collar, *g*, also revolving loosely on the axle B, and carrying a bevel-wheel, G, driving a corresponding pinion, *h*, on a crank-shaft, H, which drives the cutters I by a crank and pitman, *h′*, in the usual way.

The mechanism is thrown into and out of gear by means of a shipping-lever, G′, provided with a cam-yoke fitting over a flange on the collar *g*. A tongue or draft-frame, J, is hinged to the main frame by a pivot, *j*, so as to vibrate freely vertically. A loop, *k*, on the front of the gearing-frame encompasses the tongue, acts as a stop to limit its descent below a given point, and sustains it against lateral strains, as in turning.

A lifting-lever, L, is pivoted to vibrate vertically on the tongue, and is connected with the forward end of the gearing-frame by a cord or chain, *l*, passing over a pulley on the tongue. A pawl, L′, pivoted on the hand-lever, takes into a ratchet-plate on the tongue and holds up the gearing-frame, as described in my patent of 1858, hereinbefore referred to.

A seat, M, for the driver is mounted on an inclined arm, M′, pivoted at *m* to lugs on the draft-frame. This arm M′ is supported at a point intermediately between the pivot and the driver's seat by a link, *m′*, pivoted both to the bar and to the gear-frame, behind the main axle, as shown by the dotted lines in Figs. 1 and 2. The pivots of the tongue, the inclined arm, and of the connecting-link thus form a sort of parallel-rule joint, which compensates for the vibrations of the tongue and gearing-frame, and enables the driver to maintain his proper relation to the lifting-lever, instead of his seat rocking backward and forward, as it would do if mounted directly upon the gearing-frame. As the seat is located behind the main axle, the weight of the driver tends both to lift the tongue and to depress the rear end of the gearing-frame, thus diminishing the pressure of the cutting apparatus on the ground, and causing the machine to run more lightly.

The finger-beam N is securely fastened to a socket, N′, provided with semicircular pivots *n*, fitting in sockets *o* in pendants O O′, rigidly secured to the inner front corner of the gearing-frame, and connected by a clamping-bolt, *o′*. A metallic shoe, P, is firmly secured to and projects in advance of the front pendant O. The finger-beam is thus free to vibrate vertically on its pivots, while the shoe P is fixed. The finger-beam may likewise readily be detached from the main frame.

A supplementary guard-shoe, Q, composed of a flat bar of metal, is secured at its front end to the main frame and curved downward, and its rear end is secured to its rear pendant, O′. As this shoe is slightly elastic it relieves the pressure of the cutting apparatus upon the ground, and protects the pitman from being clogged by the cut crop; also prevents the cutters from falling out of the guards while the finger-beam is folded up.

A lever, R, is pivoted to vibrate vertically on a pivot, *r*, on the gear-frame. This lever is arranged in the same vertical plane as the finger-beam, is interposed between the tongue and the gearing-frame, and its outer end is connected by a chain, *r′*, with the finger-beam, at a point outside of its hinge. Consequently, when the gearing-frame is lifted by means of the hand-lever L, the tongue depresses the lever, and thus tips up the divider end of the cutting apparatus.

The cutting apparatus may be folded up on its hinge until it rests against the main frame, in which position it may be held by a spring-hook, S. When thus folded up the entire cutting apparatus does not project beyond the outer face of the driving-wheel A, and the machine may, consequently, be driven through gates very little wider than the distance between the driving-wheels.

The operation of this machine being similar to other machines of this class, it is deemed unnecessary to describe it here.

What I claim as my invention is—

1. The combination of the two driving-wheels, the fixed internally-geared spur-wheel on the frame, with spur-pinions on an arm revolving with the main axle, and with the interposed loose pinion on the axle, as set forth.

2. The combination of a fixed internally-geared spur-wheel, D, pinions E′, and arm E, revolving with the main axle, an interposed pinion, F, turning loosely on the main axle, and a bevel-wheel also turning loosely on the main axle, and driving the crank-shaft, the combination being and operating as set forth.

3. The combination, as described, with the fixed gear-wheel, of the disk or shield to inclose the gearing and protect the driver.

F. NISHWITZ.

Witnesses:
JOE I. PEYTON,
JOHN J. CHEW.